United States Patent
Ress, Jr.

(10) Patent No.: US 8,209,952 B2
(45) Date of Patent: Jul. 3, 2012

(54) GAS TURBINE ENGINE WITH INTERMEDIATE SPEED BOOSTER

(75) Inventor: Robert A. Ress, Jr., Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 438 days.

(21) Appl. No.: 11/973,451

(22) Filed: Oct. 9, 2007

(65) Prior Publication Data
US 2009/0293445 A1 Dec. 3, 2009

Related U.S. Application Data

(63) Continuation of application No. PCT/US2007/018551, filed on Aug. 22, 2007.

(60) Provisional application No. 60/839,306, filed on Aug. 22, 2006.

(51) Int. Cl.
*F02K 3/02* (2006.01)
*F02C 3/10* (2006.01)

(52) U.S. Cl. .......................... 60/226.1; 60/792

(58) Field of Classification Search ............... 60/39.163, 60/226.1, 774, 791, 792
See application file for complete search history.

(56) References Cited

U.S. PATENT DOCUMENTS

| 4,817,382 | A | 4/1989 | Rudolph et al. |
| 4,827,712 | A | 5/1989 | Coplin |
| 4,947,642 | A | 8/1990 | Grieb et al. |
| 4,969,325 | A | 11/1990 | Adamson et al. |
| 6,158,210 | A | 12/2000 | Orlando |
| 6,865,891 | B2 * | 3/2005 | Walsh et al. ............ 60/792 |
| 2006/0090451 | A1 | 5/2006 | Moniz et al. |
| 2007/0084188 | A1 | 4/2007 | Orlando et al. |

FOREIGN PATENT DOCUMENTS

| DE | 39 33 776 | 4/1991 |
| EP | 1 726 814 | 11/2006 |
| GB | 2130340 | 5/1984 |
| GB | 2198791 | 6/1988 |

OTHER PUBLICATIONS

International Search Report & Written Opinion, PCT/US2007/018551, Sep. 8, 2008, Rolls-Royce North American Technologies, Inc.
European Search Report, EP 07 87 3749, Jun. 4, 2010, Rolls-Royce North American Technologies, Inc.

* cited by examiner

*Primary Examiner* — Louis Casaregola
(74) *Attorney, Agent, or Firm* — Krieg DeVault LLP

(57) ABSTRACT

A gas turbine engine having speed an intermediate stage booster configured to provide speed change to a boost compressor. The boost compressor and fan stage are driven by a low pressure turbine; the fan stage rotates with the low pressure turbine shaft and the boost compressor rotates counter to the low pressure turbine shaft. The intermediate speed booster has an epicyclic gear train that includes an outer annulus, a sun gear, and a planetary gear, and may be engaged by a clutch in some embodiments.

24 Claims, 5 Drawing Sheets

GAS TURBINE ENGINE WITH INTERMEDIATE SPEED BOOSTER

PRIORITY

The present application is a continuation of PCT Patent Application No. PCT/US07/18551 filed Aug. 22, 2007, which claims the benefit of U.S. Provisional Patent Application No. 60/839,306 filed Aug. 22, 2006, each of which is incorporated herein by reference.

FIELD OF THE INVENTION

The present invention relates generally to a system for driving the compressor boost stages in a gas turbine engine. More specifically, in one form the present invention relates to a turbofan engine having a compressor boost stage system including an intershaft bearing and an epicyclic gear train. While the present invention was developed for turbofan engines it may also be utilized in other forms of gas turbine engines such as turboshaft or turboprop engines.

BACKGROUND

Turbofan engines commonly utilize compressor boost stages, or booster, driven off the fan rotor to supercharge the core thereby increasing the overall pressure ratio. Since the compressor boost stages are driven off the low pressure spool of the engine and have a tip diameter set generally by the fan blade hub line, the tip speed of the compressor boost stages is relatively low. This can lead to an engine design utilizing fairly large number of compressor boost stages to achieve a high pressure rise in the booster.

Geared fan arrangements are known where an epicyclic gear train is introduced between the low pressure turbine and the fan, thereby allowing the low pressure turbine to run at a higher speed than the fan. The compressor boost stages are then coupled to the low pressure turbine through the low pressure shaft. This arrangement not only achieves more desirable compressor boost stage (now an intermediate pressure compressor) tip speeds, but it also allows the low pressure turbine to run more efficiently. The geared fan in this arrangement may have some drawbacks. First, the epicyclic gear train is driving the fan rotor and must be designed to take the relatively heavy load of the fan. This creates a design challenge for the gear system where weight, cost, and heat generation must be minimized. Length can also be an issue as the arrangement implemented in many earlier designs introduces an additional support frame between the fan and the intermediate pressure compressor. The second frame not only adds length, but it also adds weight and cost.

Accordingly, there remains a need for further contributions in this area of technology. The present invention provides many novel and nonobvious contributions to this area of technology including a system for driving the compressor boost stages in a gas turbine engine.

SUMMARY

One embodiment of the present invention is a unique compressor boost stage for a gas turbine engine. Other embodiments include apparatuses, systems, devices, hardware, methods, and combinations for compressor boost stages. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
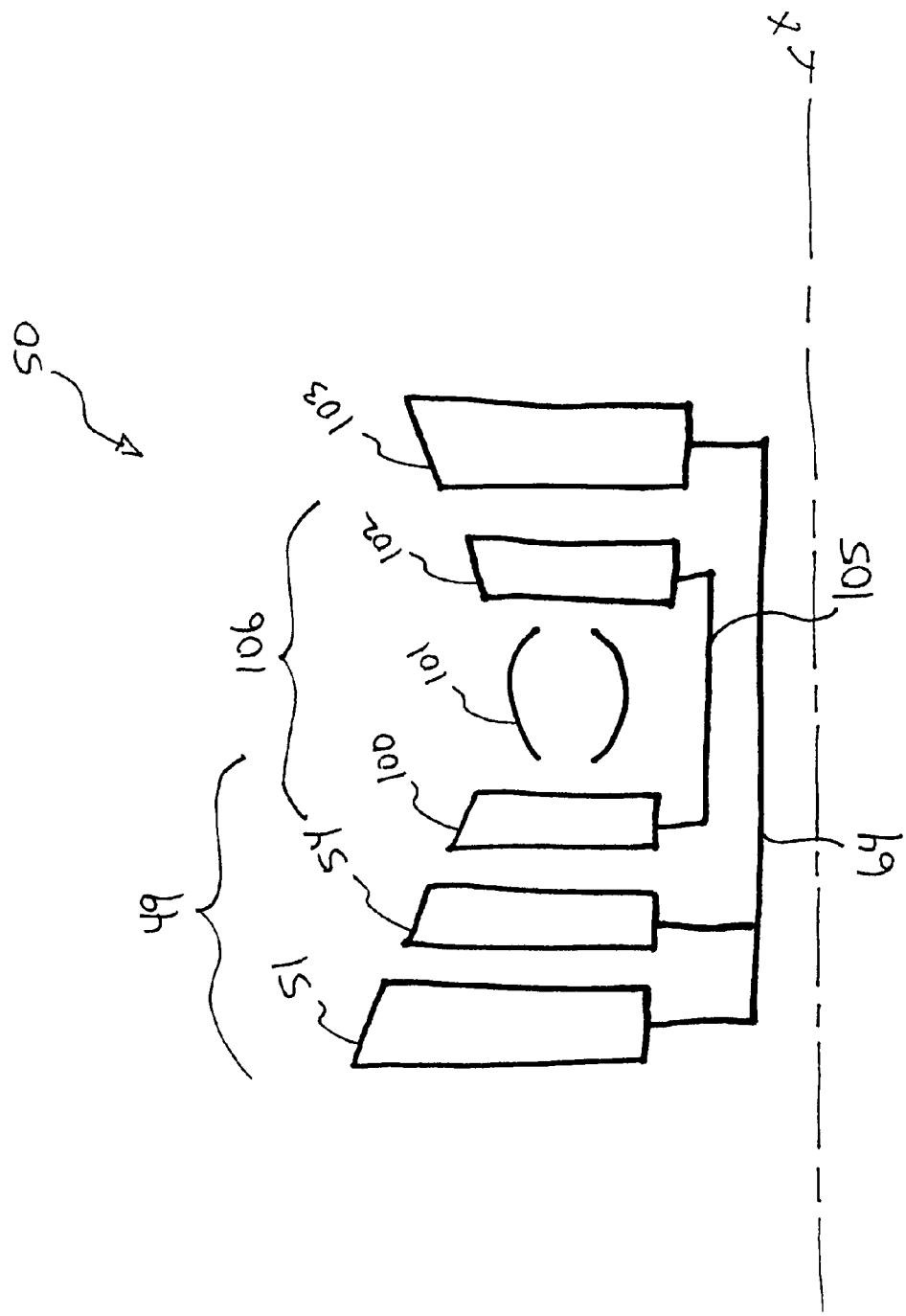
FIG. 1 is a schematic view of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the present invention contemplates a turbofan engine having a fan stage and a compressor boost stage operatively connected to a low pressure turbine by an intermediate speed booster. The intermediate speed booster may include an epicyclic gear train and a bearing arrangement that includes an intershaft bearing. In one form the epicyclic gear train is configured to provide an increase in rotational rate and contra-rotation to the compressor boost stage relative to the rotational rate and direction of the low pressure spool while the fan stage is configured to rotate with the low pressure spool. Alternate embodiments of the present application contemplate that the intermediate speed booster may be utilized to change the rotational speed of the compressor boost stage relative to the low pressure spool. Change as utilized herein unless provided to the contrary includes the ability to increase and/or decrease the rotational speed of the compressor boost stage relative to the low pressure spool. The intershaft bearing provides support and thus eliminates the need for an additional support frame for the fan. The present application contemplates that in some alternate embodiments the intermediate speed booster could be incorporated into other types of gas turbine engines, such as turboshaft or turboprop engines. In the turboshaft or turboprop gas turbine engines the compressor boost stage is located upstream of the high pressure compressor and driven by a shaft coupled with the power turbine. While the present application contemplates application in many types of gas turbine engines the description herein will be with reference to a turbofan engine.

With reference to FIG. 1, there is illustrated a schematic representation of one form of a gas turbine engine 50. Gas turbine engine 50 is a turbofan engine including a core engine 106, fan stage 51, compressor boost stage 54 and a low pressure turbine 103. Additionally, the entire compression stage which includes fan stage 51, compressor boost stage 54, and high pressure compressor 100 will be denoted by feature number 49. Core engine 106 is located downstream of the fan stage 51 and includes a high pressure compressor 100, combustor 101, and high pressure turbine 102. In operation core engine 106 generates combustion gases that are delivered downstream to the high pressure turbine 102 and low pressure turbine 103. The turbines 102 and 103 extract energy from the combustion gases and power the respective high pressure compressor 100, fan stage 51, and compressor boost stage 54. Fan stage 51 and compressor boost stage 54 are coupled to the low pressure turbine 103 by LP shaft 64. High pressure compressor 100 is coupled to the high pressure turbine 102 by HP shaft 105. While the present application is being described relative to a two spool engine it is also contemplated for application with a three spool engine.

Figure 2:
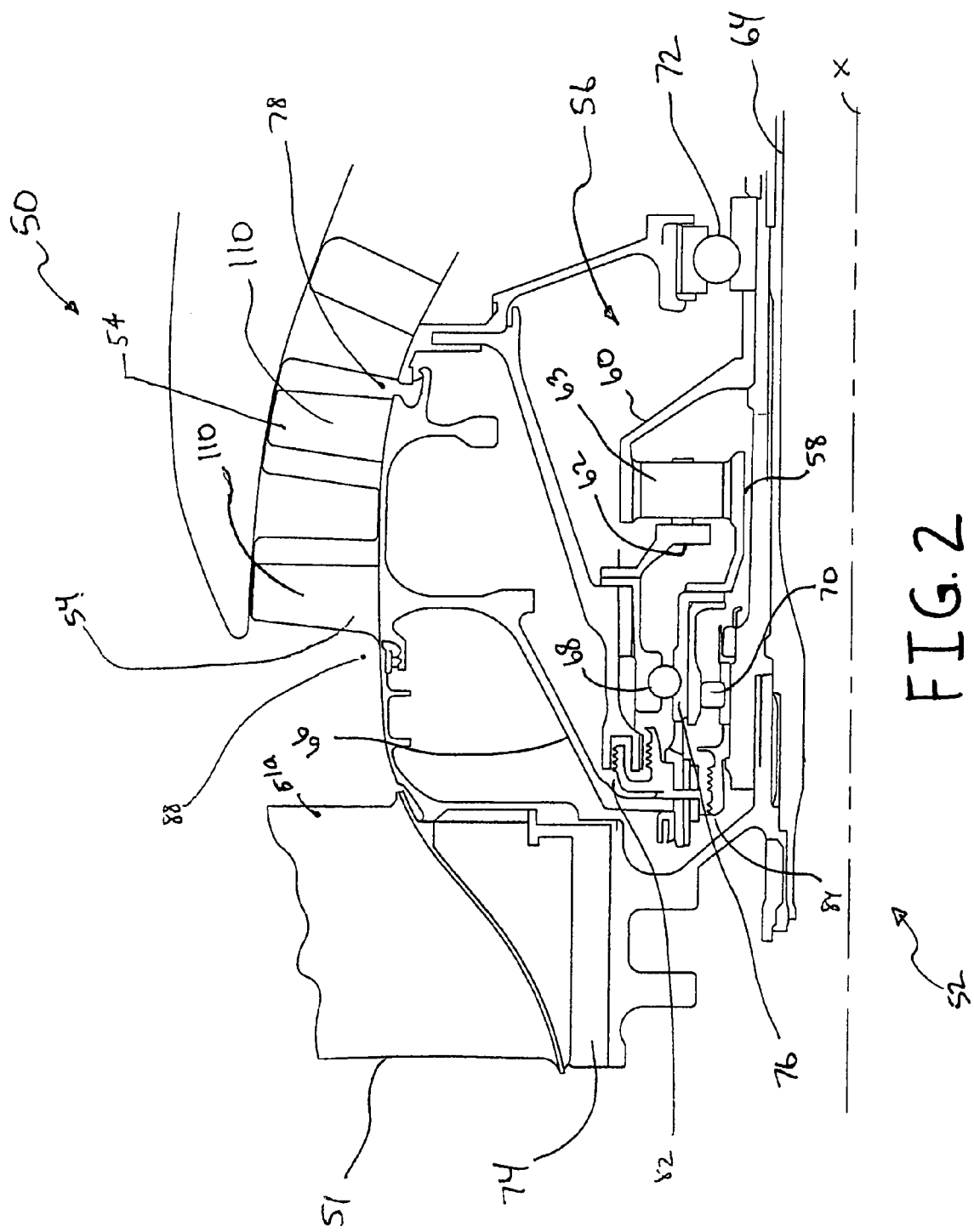
FIG. 2 is a partial view of one embodiment of a turbofan engine.

With reference to FIG. 2, there is illustrated a partial view of turbofan engine 50 having fan stage 51 and an intermediate speed booster 52 that is configured to drive the compressor boost stages 54 through a gear train 56. In one preferred form the gear train 56 is an epicyclic gear train. Those skilled in the art will recognize that the working fluid flow traverses FIG. 2 from left to right and proceeds through other components not shown in the figure, such as combustor and turbines. In one form the epicyclic gear train 56 provides for contra-rotation of the compressor boost stages 54 relative to the fan stage 51 which allows for the elimination of a stationary vane ahead of the first rotating stage of the compressor boost stages 54. Fan stage 51 includes a plurality of fan blades 51a. In some embodiments, however, a stationary vane may be used ahead of the first rotating stage of the compressor boost stages 54. Further, the present application contemplates alternate embodiments wherein the gear train 56 rotates the compressor boost stages 54 in the same direction as the fan stage.

Figure 2A:
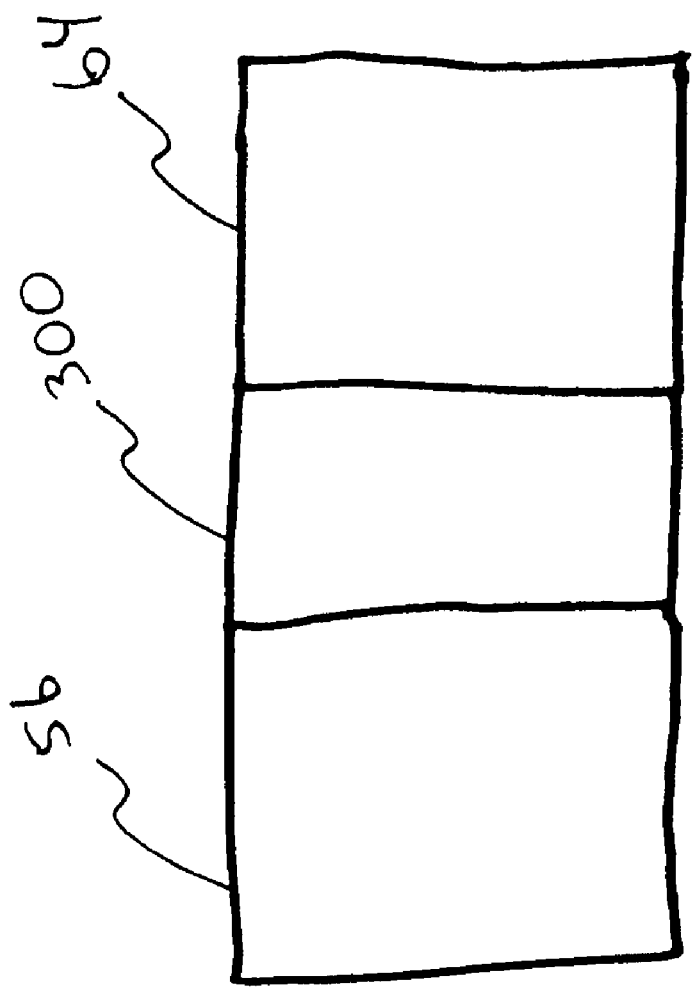
FIG. 2a is a schematic representation of one form of the present invention comprising a clutch.

The present application contemplates some embodiments incorporating a clutch for controlling the transmission of power to the epicyclic gear train 56. FIG. 2a sets forth a schematic representation of a clutch for controlling the transmission of power to the gear train. The incorporation of a clutch into the system allows for additional capability including dual mode or variable cycle engine operation. The clutch may be a hydraulically actuated, multi-disc wet clutch in some embodiments. In operation, the intermediate speed booster 52 could be engaged when a high overall pressure ratio is desired and then disengaged when high overall pressure ratio is unnecessary or undesired. When disengaged, the compressor boost rotor can be configured to freewheel in the flow stream. Bypass doors can also be incorporated in some embodiments.

One form of the clutch contemplated herein is housed within the annulus 60 with steel floating plates splined to the outer annulus and clutch disks splined to the LP shaft through a clutch housing. A cover plate will retain the clutch plates within the annular housing along with a hydraulically actuated piston. Pressurized oil is delivered to the system to control movement of the hydraulic piston and the engagement and disengagement of the clutch. In one form the clutch is engaged by the delivery of pressurized oil through the LP shaft. However, other pressurized oil delivery routes are contemplated herein.

The epicyclic gear train 56 provides a mechanical speed boost and contra-rotation to the compressor boost stage 54, and includes a sun gear 58, outer annulus 60, and a fixed planet carrier 62. Outer annulus 60 includes gear teeth on its inner circumference that mesh with the gear teeth of the planet gears 63. The outer annulus 60 is coupled to LP shaft 64 and rotates upon rotation of the LP shaft 64. The outer annulus 60, furthermore, is rotatingly coupled to the sun gear 58 through the fixed planet carrier 62, which may have any number of planet gears 63. Therefore, as the LP shaft 64 is rotated the gear teeth on the inner circumference mesh with the plurality of planet gears 63 and cause rotation of the sun gear 58.

As discussed above, in some embodiments, a clutch may be incorporated into the system so that the epicyclic gear train 56 may be selectively engaged and disengaged from the LP shaft 64. Clutch 300 is actuated to control the transmission of power from LP shaft 64 to gear train 56. When the outer annulus 60 is caused to rotate by rotation of LP shaft 64, the sun gear 58 is caused to rotate in the opposite direction through the fixed planet carrier 62. However, the present application contemplates alternative gearing that will allow the rotation of the compressor boost stages 54 in the same direction as the LP shaft. Sun gear 58 is furthermore coupled to a boost rotor 66 of the compressor boost stage 54 thereby providing contra-rotation of the plurality of blades 110 forming the compressor boost stage 54. In one embodiment the epicyclic gear train 56 provides gear ratios that provide mechanical speed boost ranging from 1.5/1 to 3/1. In a more preferred embodiment, a gear ratio near 2/1 can be achieved. The present application is not intended to be limited to these gear ratios unless specifically provided to the contrary and other gear ratios are contemplated herein. Further, the present application contemplates a gear train which reduces the rotational speed of the compressor boost stage 54 to less than the rotational speed of the LP shaft.

A number of bearings are utilized in the present invention including a thrust bearing 68, a radial intershaft bearing 70, and a thrust bearing 72. Thrust bearing 68, sometimes referred to as the booster thrust bearing, carries the combined radial load of the fan rotor 74 and the boost rotor 66 but only the thrust load of the boost rotor 66. In one form sun gear 58 is coupled to the boost rotor 66 through an inner ring 76 of thrust bearing 68. Thrust bearing 72 is mounted downstream of the epicyclic gear train 56 and carries the thrust load of fan rotor 74. The radial intershaft bearing 70 is located downstream of the fan rotor and is mounted inside the first thrust bearing 68 supporting the boost rotor 66.

The introduction of the intershaft bearing 70 eliminates the need for an additional support frame associated with the fan stage 51. In one alternative embodiment, a squeeze film oil damper could be incorporated behind the thrust bearing 68 and/or thrust bearing 72. Further details regarding squeeze film oil dampers are not set forth herein as they are believed to be generally known to one of skill in the art. Other bearing configurations that provide support for the intermediate speed booster are also contemplated herein.

Figure 4:
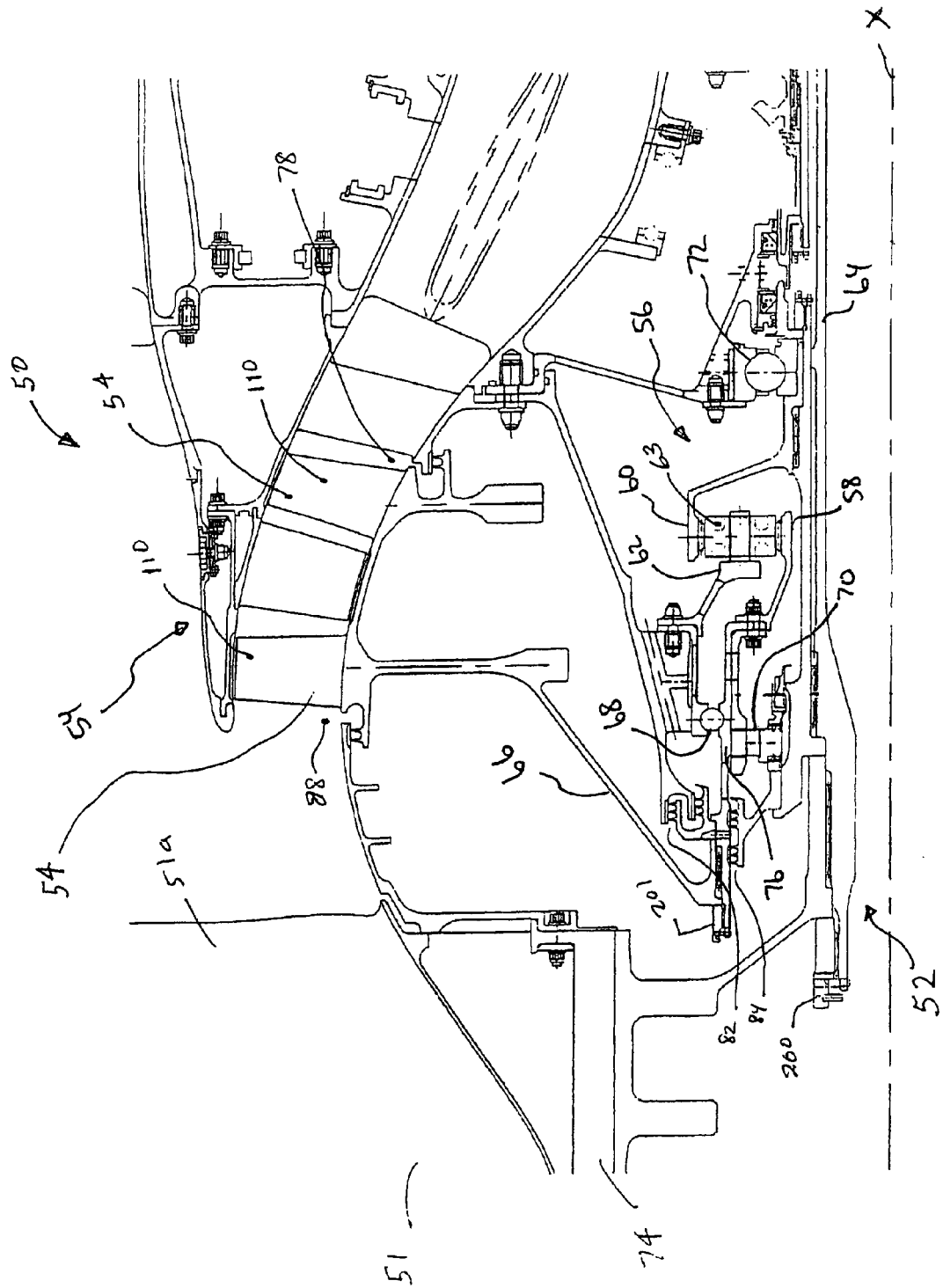
FIG. 4 is a view of FIG. 2 illustrating additional detail that had been removed from FIG. 2 for clarity.

In one form of the present invention the fan rotor 74 and boost rotor 66 can both be removed with the removal of their respective spanner nuts 200 and 201 (FIG. 4). In one form of the present application, at this point, the sump remains fully sealed. The bearings, seals and epicyclic gear train can be contained in a forward support module which can then be fastened to the forward frame of the engine.

Figure 3:
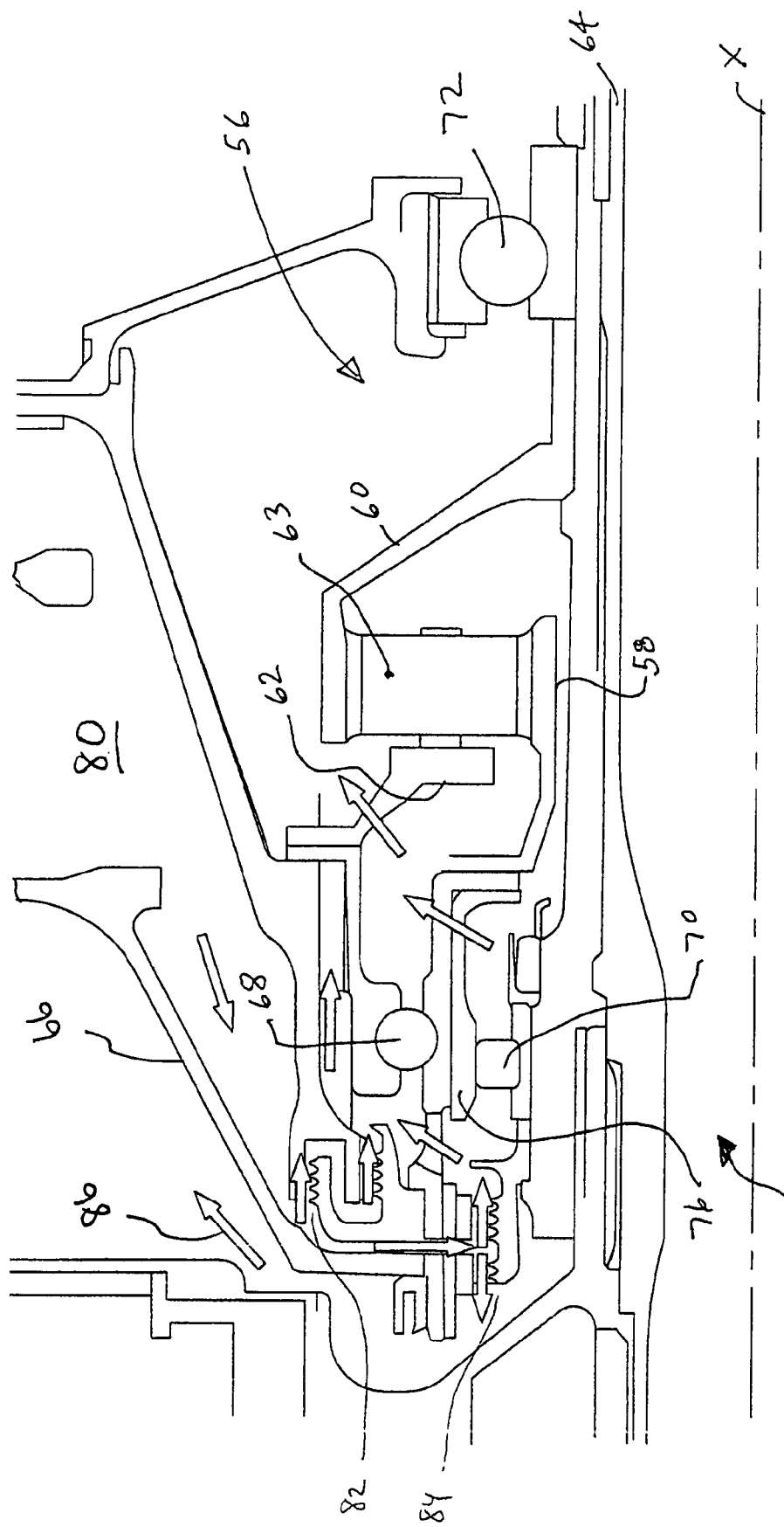
FIG. 3 is a partial view of a turbofan engine depicting buffer air flow paths.

With reference to FIG. 3, there is illustrated the flow of buffer air that is drawn from the booster exit 78 and flows down the rotor bore cavity 80 to pressurize outboard 82 and inboard 84 labyrinth seals. Leakage air 86 flows up the forward end of the boost rotor 66 and discharges into the flow path 88 ahead of the boost rotor 66.

With reference to FIG. 4, there is illustrated a view of FIG. 2 including detail that had been removed from FIG. 2 for clarity. Epicyclic gear train 56 includes sun gear 58, outer annulus 60, and fixed planet carrier 62. The outer annulus 60 is coupled to LP shaft 64 and rotates upon rotation of the LP shaft 64. The outer annulus 60 is rotatingly coupled to the sun gear 58 through the fixed planet carrier 62, which may have any number of planet gears. The sun gear 58 is furthermore coupled to boost rotor 66 of the compressor boost stage 54 thereby providing contra-rotation of the compressor boost stage 54. The sun gear 58 is coupled to the boost rotor 66 through an inner ring 76 of the thrust bearing 68. The thrust bearing 72 is mounted downstream of the epicyclic gear train 56 and carries fan rotor 74 thrust. The radial intershaft bearing 70 is located downstream of the fan rotor and is mounted inside the first thrust bearing 68 supporting the boost rotor 66.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A turbofan engine comprising:
   turbomachinery components limited to two shaft driven spools, the components including a low pressure spool and a high pressure spool, the low pressure spool including a low pressure turbine;
   a low pressure shaft coupled to and rotatable by operation of said low pressure turbine;
   a bladed air moving device coupled to said low pressure shaft;
   a boost compressor located downstream of said bladed air moving device and substantially free from driven rotation with respect to the high pressure spool; and
   a mechanical speed booster coupled with said low pressure shaft and said boost compressor, said mechanical speed booster operable to drive said boost compressor at a rotational speed different than the rotational speed of said low pressure shaft.

2. The turbofan engine of claim 1, wherein the mechanical speed booster is operable to drive said boost compressor at a rotational speed greater than the rotational speed of said shaft.

3. The turbofan engine of claim 1, wherein said mechanical speed booster includes a gear train.

4. The turbofan engine of claim 3, wherein the gear train is an epicyclic gear train having a sun gear, an annulus gear, and a plurality of planet gears.

5. The turbofan engine of claim 1, wherein the mechanical speed booster is operable to drive said boost compressor at a rotational speed within a range from 1.5 to 3 times the rotational speed of said shaft.

6. The turbofan engine of claim 1, which further includes a clutch operable to selectively engage and disengage said mechanical speed booster with said shaft.

7. The turbofan engine of claim 1, which further includes a radial intershaft bearing to support said boost compressor.

8. The turbofan engine of claim 1, which further includes means for carrying the load associated with said bladed air moving device.

9. The turbofan of claim 1, wherein said bladed air moving device rotates at the rotational speed of said shaft, and wherein said bladed air moving device is a fan.

10. The turbofan engine of claim 1, wherein the mechanical speed booster is operable to drive said boost compressor at a rotational speed less than the rotational speed of said shaft.

11. The turbofan engine of claim 1, wherein said mechanical speed booster includes a gear train, said gear train is an epicyclic gear train having a sun gear, an annulus gear, and a plurality of planet gears;
   which further includes means for carrying the load associated with said bladed air moving device; and
   wherein said bladed air moving device rotates at the rotational speed of said shaft.

12. The turbofan engine of claim 1, wherein said boost compressor includes a plurality of stages.

13. The turbofan engine of claim 1, wherein said bladed air moving device and boost compressor rotate in opposite directions.

14. A gas turbine engine comprising:
   a dual spool turbine having a low pressure turbine and a high pressure turbine;
   a high pressure compressor;
   a shaft coupled to and rotatable by operation of said low pressure turbine;
   a boost compressor located upstream of said high pressure compressor and incapable of mechanical connection with respect to rotation of the high pressure compressor; and
   a transmission coupled with said low pressure shaft and said boost compressor, said transmission operable to drive said boost compressor at a rotational speed different than the rotational speed of said low pressure shaft;
   wherein the gear train is an epicyclic gear train having a sun gear, an annulus gear, and a plurality of planet gears.

15. The gas turbine engine of claim 14, wherein said transmission is operable to drive said boost compressor at a rotational speed greater than the rotational speed of said low pressure shaft.

16. The gas turbine engine of claim 14, which further includes means for selectively engaging and disengaging the transmission of power from said low pressure shaft to said transmission.

17. The gas turbine engine of claim 14, wherein said transmission operable to drive said boost compressor at a rotational speed less than the rotational speed of said low pressure shaft.

18. The gas turbine engine of claim 14, wherein the gas turbine engine is a turboprop.

19. The gas turbine engine of claim 14, wherein the gas turbine engine is a turboshaft.

20. A turbofan engine comprising:
   a relatively low pressure turbine;
   a shaft coupled to and rotatable by operation of said relatively low pressure turbine;
   a bladed rotor coupled to said shaft;
   a boost compressor located downstream of said bladed rotor;
   means for rotational speed change of said boost compressor stage; and
   means for selective coupling of the boost compressor to the shaft.

21. A turbofan engine comprising:
   a turbine;
   a shaft coupled to and rotatable by operation of said turbine;

a fan coupled to said shaft and fixed to the rotational speed of said shaft;
a boost compressor coupled to said shaft;
a gear box between said shaft and said boost compressor, said gear box operable to drive said boost compressor at a rotational speed different than the rotational speed of said shaft; and
a clutch operable to selectively engage and disengage the transmission of power from said shaft to said boost compressor.

22. The turbofan engine of claim 21, wherein said gear box is operable to drive said boost compressor at a rotational speed greater than the rotational speed of said shaft.

23. The turbofan engine of claim 21, which further includes means for carrying the load associated with said fan.

24. The turbofan of claim 21, wherein said fan rotates in the same direction as said shaft and wherein said boost compressor rotates in the opposite direction of said fan.

* * * * *